United States Patent [19]
Tran et al.

[11] Patent Number: 5,809,533
[45] Date of Patent: *Sep. 15, 1998

[54] DUAL BUS SYSTEM WITH MULTIPLE PROCESSORS HAVING DATA COHERENCY MAINTENANCE

[75] Inventors: Dan Trong Tran; Paul Bernard Ricci, both of Laguna Niguel; Jayesh Vrajlal Sheth, Mission Viejo; Theodore Curt White, Tustin; Richard Allen Cowgill, Lake Forest, all of Calif.

[73] Assignee: Unisys Corporation, Blue Bell, Pa.

[*] Notice: The term of this patent shall not extend beyond the expiration date of Pat. No. 5,511,224.

[21] Appl. No.: 797,216

[22] Filed: Feb. 11, 1997

Related U.S. Application Data

[63] Continuation of Ser. No. 650,928, May 17, 1996, abandoned, which is a continuation of Ser. No. 18,996, Feb. 18, 1993, abandoned.

[51] Int. Cl.$^6$ .................................................. G06F 13/16
[52] U.S. Cl. .................... 711/141; 711/142; 711/143; 711/144; 711/145; 711/146; 711/119; 711/120; 711/129; 711/173; 395/308; 395/800.13
[58] Field of Search ................................ 395/800, 471, 395/448, 117, 7, 308, 800.13; 711/119, 120, 129, 142, 143, 146, 173, 141

[56] References Cited

U.S. PATENT DOCUMENTS

| | | | |
|---|---|---|---|
| 4,490,785 | 12/1984 | Strecker et al. | 395/308 |
| 4,987,529 | 1/1991 | Craft et al. | 395/293 |
| 5,025,365 | 6/1991 | Mathur et al. | 395/448 |
| 5,255,384 | 10/1993 | Sachs et al. | 395/417 |
| 5,283,886 | 2/1994 | Nishii et al. | 395/471 |
| 5,317,716 | 5/1994 | Liu | 395/471 |
| 5,511,224 | 4/1996 | Tran et al. | 395/800 |

*Primary Examiner*—Tod R. Swann
*Assistant Examiner*—Denise Tran
*Attorney, Agent, or Firm*—Alfred W. Kozak; Mark T. Starr; Steven R. Petersen

[57] ABSTRACT

A multi-module network having dual system busses using a common bus protocol which supports processor modules using a store-through cache memory and processor modules using a non-store-through cache memory which includes interface modules including a spy unit for maintaining cache coherency and arbiter modules so that any particular module is not starved out. A maintenance processor organizes the network as a joined system where both the store-through and non-store through processor units can utilize either one of the dual system busses or a split system where one bus is dedicated to the store-through processor units and one bus is dedicated to the non-store through processor units.

7 Claims, 5 Drawing Sheets

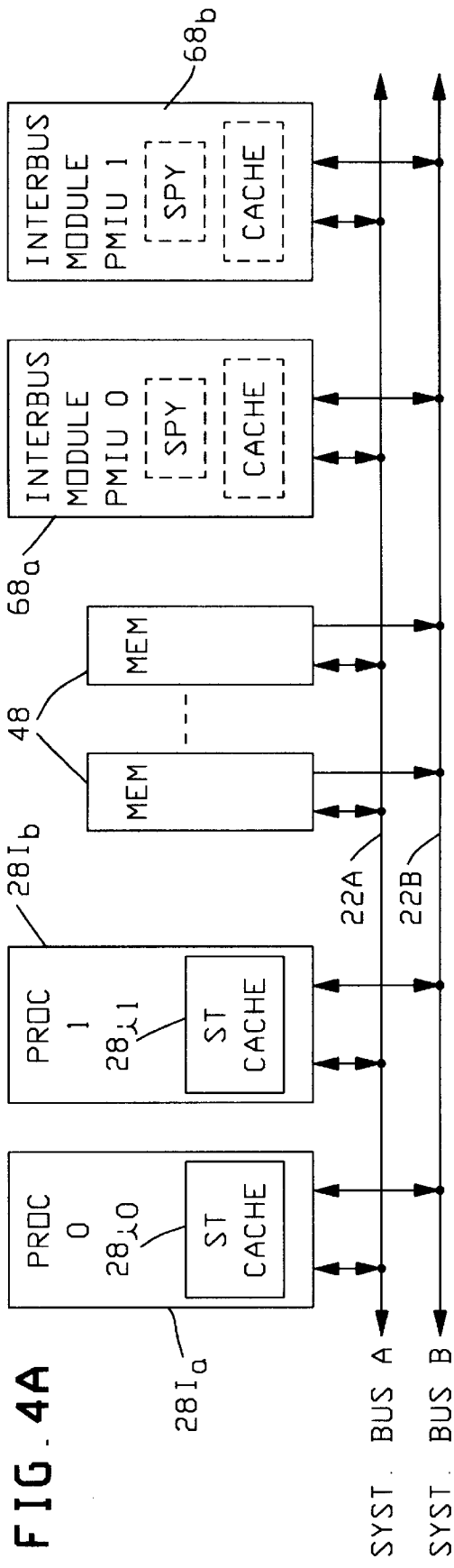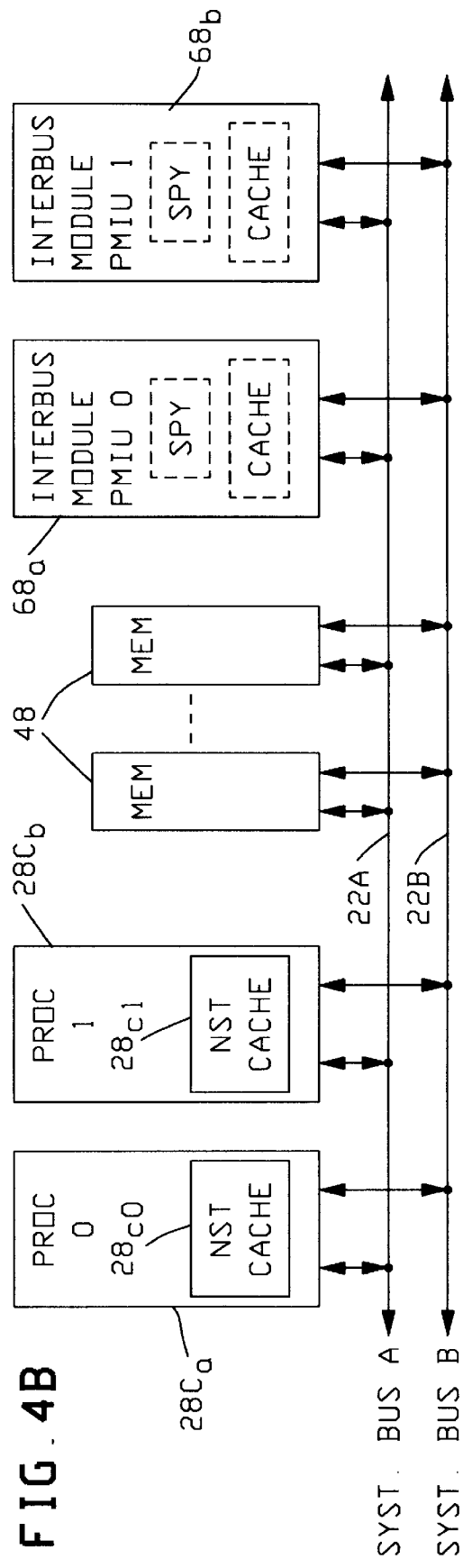

DUAL BUS SYSTEM WITH MULTIPLE PROCESSORS HAVING DATA COHERENCY MAINTENANCE

This is a continuation of application Ser. No. 08/650,928 filed on May 17, 1996, now abandoned which is a continuation of application Ser. No. 08/018,996 filed on Feb. 18, 1993, now abandoned.

FIELD OF THE INVENTION

This disclosure relates to dual system busses which are duplicates of each other and which operate on common protocols suitable for processor modules having Store-Through cache memories and also having Non-Store through cache memories.

CROSS REFERENCES TO RELATED INVENTIONS

This application is related to the following co-pending applications and U.S. Patents on related systems and circuitry which are included herein by reference.

U.S. Pat. No. 5,495,585 entitled "Programmable Timing Logic System For Dual Bus Interface"; U.S. Pat. No. 5,444,860 entitled "Translator System For Message Transfers Between Digital Units Operating On Different Message Protocols And Different Clock Rates"; U.S. Pat. No. 5,404,462 entitled "Dual Bus Interface Transfer System For Central Processing Module."

U.S. Ser. No. 08/406,811 entitled "Synchronous Dual Bus System for Store-Through and Non-Store-Through Cache Memories in Multiprocessor Networks.

BACKGROUND OF THE INVENTION

As the networking of multiple types of processors, input/output units and peripheral s increases in scope and complexity, many unique problems arise involving the intercommunication of commands, messages, and data between the variously interconnected modular units. It is necessary that there be taken into account means for allowing flexibility within the system, means for accommodating different types of processing units, and means for allowing partitioning, if required, all in addition to providing high system speed and throughput with proper data transfer, integrity, and error correction means. Further, networks which use only one system bus are subject to halt-down should the system bus fail so that a dual replicatable system bus can be used to eliminate this problem to provide redundancy but such duplicatable or replicatable system busses incur some additional problems in regard to communications between the various modules.

Prior art systems such as U.S. Pat. No. 4,622,630 entitled "Data Processing System Having Unique Bus Control Protocol" involve a single common bus which is used for communication of address and data information among various system components but wherein the single bus is time multiplexed in order to provide periods for address transfer and periods for data information transfer thus slowing the throughput to some extent.

In U.S. Pat. No. 4,982,321 entitled "Dual Bus System", there is provided an architecture where two system busses are used for entirely different purposes and are not replicates of each other. Thus one bus in this system is operable for memory operations while another bus is operable for input/output operations, but there is no redundancy or means by which any one of the busses can be used for all of the necessary functions. Thus this type of system could not operate on a single bus alone since it, at all times, requires at least two busses for normal operation.

U.S. Pat. No. 4,535,448 entitled "Dual Bus Communication System" involves a dual set of busses used to provide coupling between data services and voice services of a particular AT&T communication system designated as the CS 300. In this system, one bus functions on a time division basis for communication between port circuits, while the other bus functions as a packet-switch data processing bus for interfacing system peripherals with port circuitry. Again here the busses in the system are dissimilar and are not interchangeable and thus cannot provide any redundancy.

In U.S. Pat. No. 4,933,846 entitled "Network Communications Adaptor With Dual Interleaved Memory Banks Serving Multiple Processors", the system involves dissimilar busses such that one bus functions for transferring addresses and the other functions only for the transfer of data.

The architecture of the presently disclosed system network involves particularized dual system busses which are replicates of each other but are also capable of operating independently and thus providing redundant bus transfer facilities to each of the attached digital modules. Thus each one of the two system busses involved is a duplicate of the other so that the system can operate on any one of the busses should either system bus fail.

Further the dual system busses operate on a single type of protocol which is compatible for processors having Store-Through (ST) cache memory units and also for Non-Store-Through (NST) cache memory units.

Thus the objects of the invention are to provide an enhanced throughput of data transfer operations between multiple types of processor modules, multiple memory modules, and multiple input/output interface modules and permitting, not only redundancy, but partitioning and flexibility of bus arbitration and flexibility of system operation, while using a common bus protocol applicable for use of store-through and non-store through cache memories.

SUMMARY OF THE INVENTION

The present invention provides a specialized dual system bus capability by which different types of processor modules having different types of cache functions can be connected and integrated for efficient data transfer operations and computer processing. Each one of the specialized dual system busses provides separate data lines for each of the functions of control, status, arbitration, clock signals, and address/command/data information transfer.

Multiple choice of bus pathways are provided for each module when it becomes a module requesting bus access. Additionally multiple pathways are provided via the dual system busses for receipt of data when a module becomes a receiving module. Additionally, there can be simultaneous operations wherein a single module can be both transmitting information on one system bus and receiving information on the other bus line, thus enhancing throughput. A primary benefit of the dual bus system is the capability of operational activity for processors having Store-Through cache memory units and at the same time having the capability of using the same data transfer protocol for operating with processing units having Non-Store-Through (NST) cache capability. The data transfer commands and protocol described herein enable the same bus to be used for one configuration involving Store-Through cache memory units in a processor or alternatively being available for operating with processing units having Non-Store-Through capability without any change in the bus structure or the bus protocol of the system.

BRIEF DESCRIPTION OF THE DRAWINGS

FIG. 4A is a architectural drawing showing how the dual system busses are interconnected with a number of processors which use Store-Through cache memory units;

FIG. 4B is a network diagram showing how the dual system busses are connected to processors having a Non-Store-Through cache memory unit.

DESCRIPTION OF PREFERRED EMBODIMENT

Figure 1A:
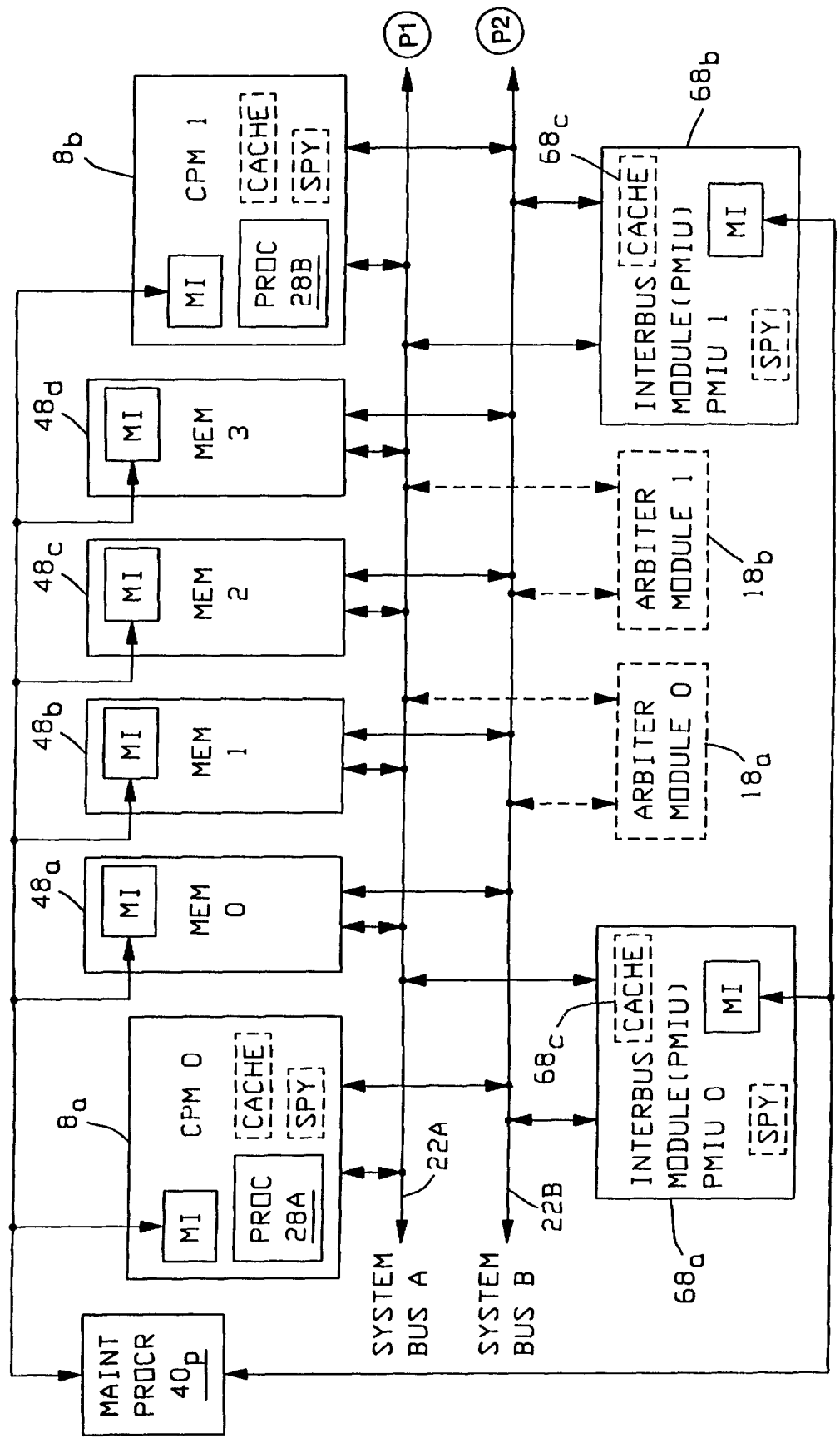
FIGS. 1A and 1B illustrate a system network wherein dual system busses are connected to each and every one of the active modules which may include the central processing module, the memory modules, and other modules such as the interbus module and arbiter modules.
Figure 1B:
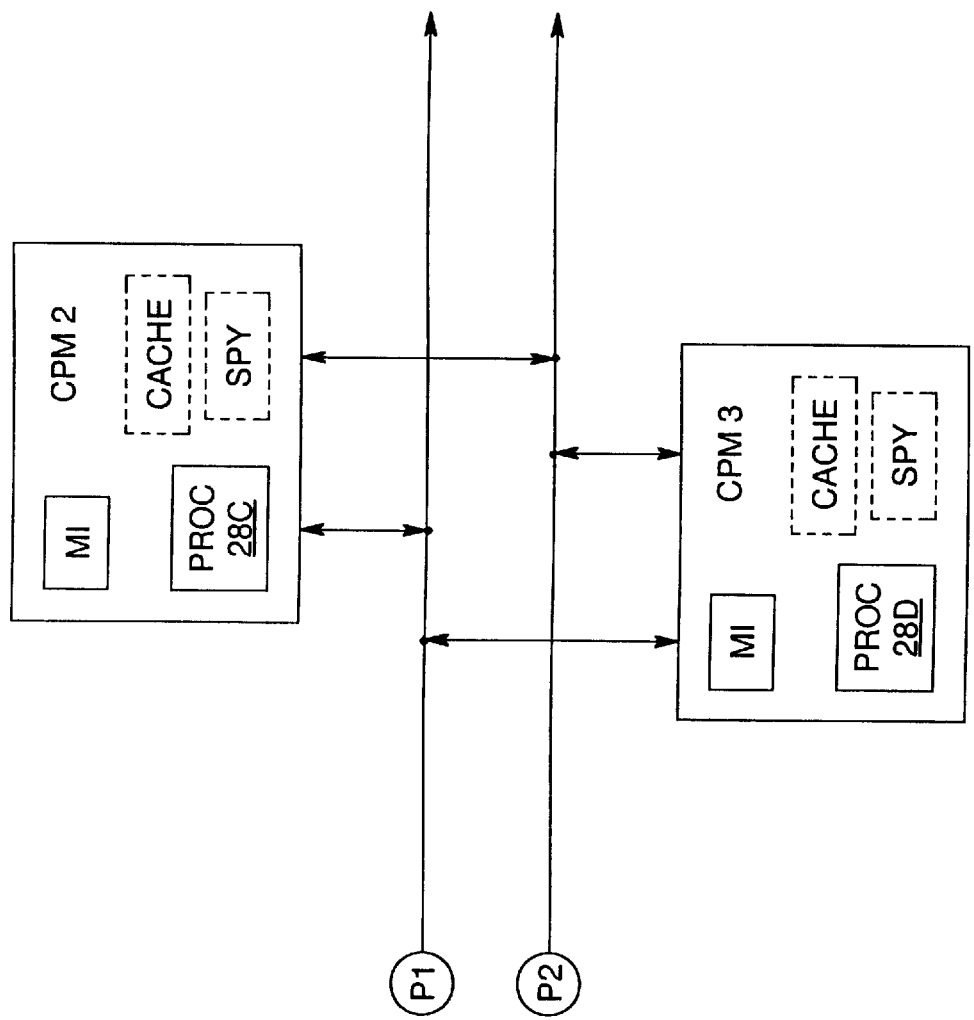

The dual system bus and digital module complex described herein is incorporated in a multiple processing system complex (FIGS. 1A and 1B) developed by the Unisys Corporation of Blue Bell, Pa. and designated as the A-11 computer system. The system busses 22A, 22B, connect various processing elements (such as central processing modules 8a, 8b, and input/output units 68a, 68b) and memory modules 48 to provide a shared communication path between these modules. In FIGS. 1A, 1B each of the connected modules will be seen to have Maintenance Interface (MI) Units connected to Maintenance Processor 40p for maintenance and configuration purposes. FIG. 1B further illustrates the additional CPM modules CPM2, CPM3 similar to 8a and 8b which operate on the system buses 22A, 22B.

Since the A-11 computer system will support different types of processors, it may be illustrative to indicate such types of processors. For example, the processor 28 of FIG. 3 may be implemented in different versions of processing architecture. One type may be called the IMP processor (FIG. 4A) 28I and which processor has a cache unit which operates as a Store-Through (ST) cache memory unit. Another version of the processor 28 of FIG. 3 may be a processor designated as the CHAMP processor, 28C which processor has a different type of cache memory unit designated as a Non-Store-Through (NST) cache memory unit. The dual bus protocol will support both the Store-Through cache operations and the Non-Store-Through cache operations so that the bus has the flexibility of working with two different types of processors having cache memory units of a different nature.

In a Store-Through (ST) environment, the dual bus capability will allow processing elements (PE) to access memory modules only. In a Non-Store-Through (NST) environment, the dual bus capability allows processing elements to access both the memory modules involved and private NST cache memories of the processor modules. In addition to servicing both types of environments, the dual bus capability will support message transfer and other state access information such as acquiring time-of-day information (TOD) between processing elements and other modules.

The system bus capability is of a dual nature so that one system bus 22A is a duplicate or replicate of the other system bus 22B permitting the system operations to avoid single points of failure, to isolate system performance when a partitioned system is desired, and also to increase the throughput and overall system performance of joint systems. Thus the two system busses 22A and 22B are essentially identical and referred to as System Bus A and System Bus B, seen in FIG. 1 as 22A and 22B.

Each digital module on the system busses connects to both of the busses A and B. In a dual or "joined" system configuration as set up by Maintenance Processor 40p, the module on the bus can use either of the two busses as availability permits. If one of the busses fails to operate, the system can still continue to operate with only one bus being operational. The broken bus is deactivated by the disabling of "bus grant commands" to the requestor modules on the failed bus.

In a split or "partitioned" system, a particular bus is assigned to each partition by Maintenance Processor 40p and the modules in the partition can only use the bus assigned to that partition. If the particular bus assigned to a partition should fail, the failed partition would be taken off-line.

GENERAL OVERVIEW:

The system busses provide a shared communication path between processors such as processors 28A and 28B (FIGS. 1A, 1B), in addition to the main memory modules $48_{abcd}$ and the input/output modules designated as the interbus modules PMIU $68_a$ and $68_b$. The system bus permits modules to access main memory and cache memory units, to transfer messages and to access other states of information such as a time-of-day (TOD) counter in the interbus modules 68a and 68b.

In order to avoid single points of failure, the bus is duplicated and thus permits isolation of system performance into a partitioned system and also can enable and improve performance of a joined system. Since the two system busses are basically identical and since all the modules in the system connect to both of the busses, various flexibility in operations are permissible. In a "joined" configuration, the module on the bus can use either of the busses as bus availability permits. In a partitioned "split system", a particular bus is assigned to each partition and the modules in that partition can only use the bus assigned to that particular partition.

Figure 2:
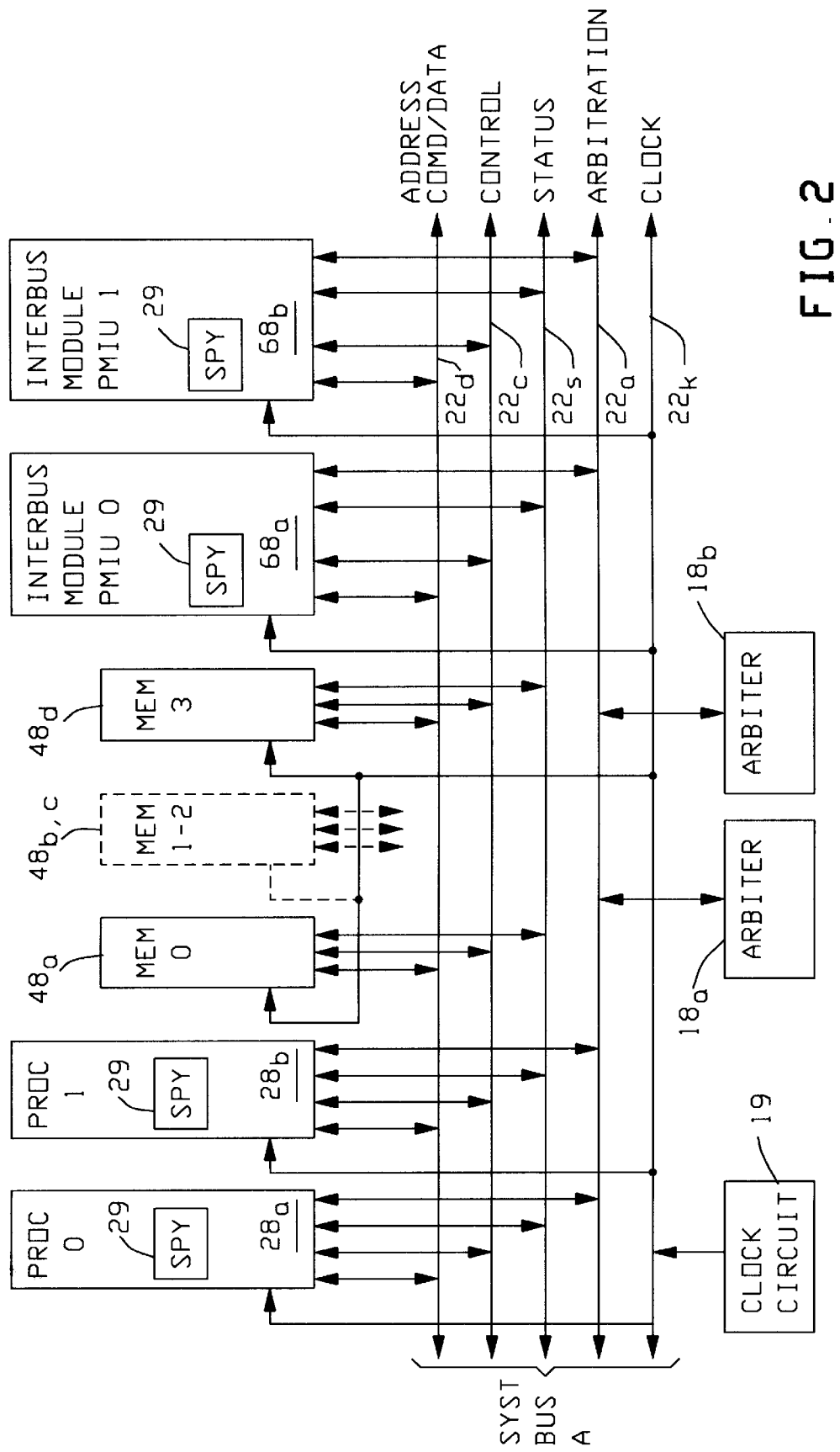
FIG. 2 is a drawing showing the details of one of the system busses and how the various functions provided are apportioned on individual lines of the bus.

In the presently described configuration, the system bus may be run synchronously on a 16 megahertz clock, for example, shown as item 19 in FIG. 2. As seen in FIG. 2, each system bus is divided into five segments for handling transfer of specialized data such that the bus segment $22_d$ will handle address/and command/data while segment $22_c$ will handle control data, segment $22_s$ will handle status information, segment $22_a$ will handle arbitration operations and segment $22_k$ will provide the clocks for synchronizing each of the module activities.

Figure 3:
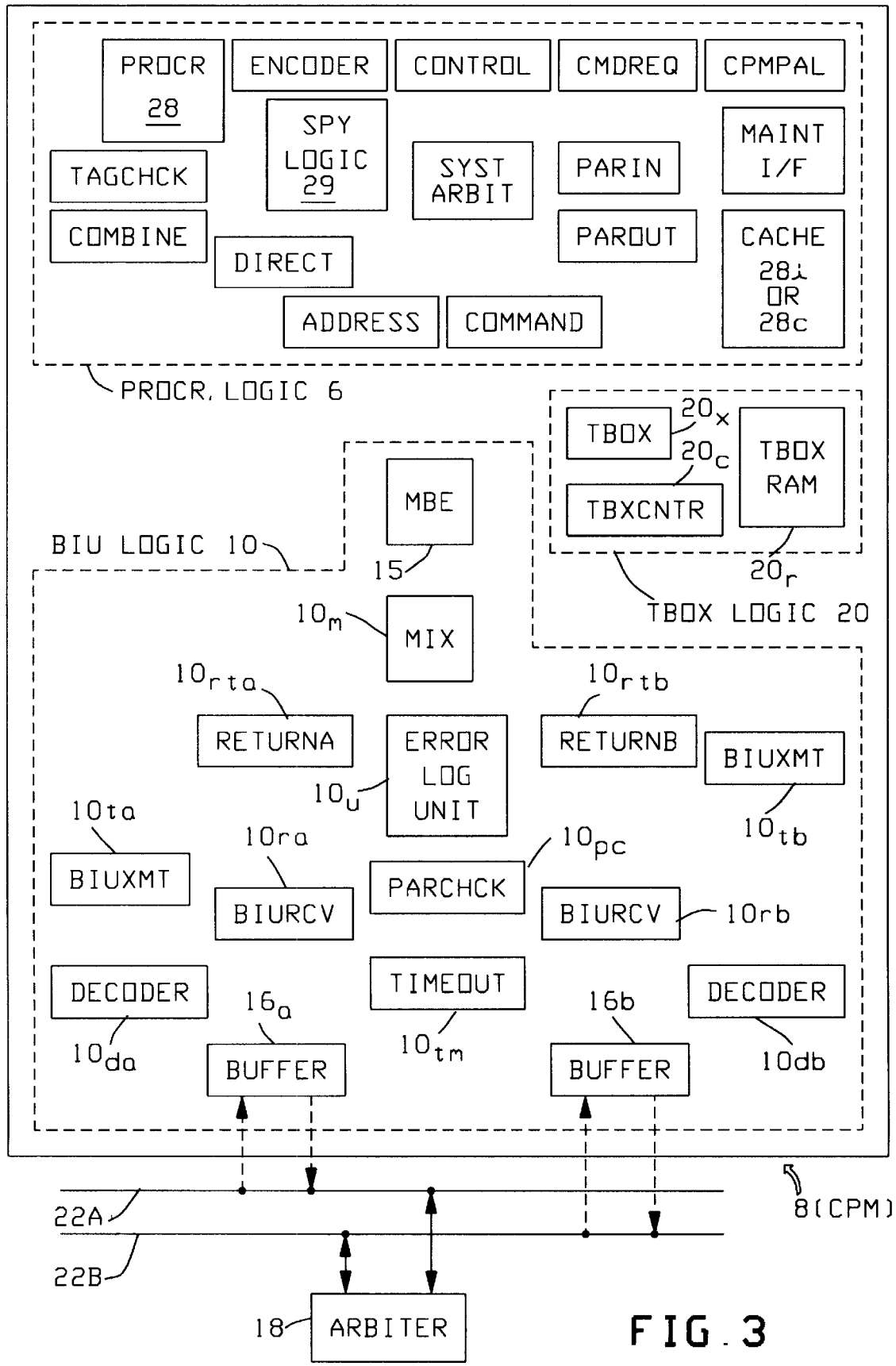
FIG. 3 is a schematic drawing of a typical central processing module which indicates various sections designated as the processor logic, the transfer box logic and the bus interface unit logic.

The system bus operates as a synchronous bus and the command set for the bus is so defined as to support both Store-Through (ST) and also Non-Store-Through (NST) cache memory environments. The access of a requester module to the bus is handled by bus arbitration units $18_a$ and $18_b$ shown in FIG. 2. In another configuration such as indicated in FIG. 3, the system arbitration may be provided by a system arbitration circuit module within the central processing module 8 of FIG. 3. Thus bus arbitration can also be handled through a central arbiter being retained in the central processing module 8 at just that position to the central Processing Modules $8_a$ and $8_b$ (FIG. 1). The bus arbiter such as $18_a$ and $18_b$ of FIGS. 1 and 2, implements a "fairness" arrangement in order assign bus availability to the requesting modules. It only requires a single bus transaction to complete the request for data access and the data return execution. The address signals and the data signals on the bus are multiplexed and are checked for integrity with a byte parity arrangement.

SYSTEM BUS PERFORMANCE: The time-for-access of data access operations will depend upon the memory response time in the memory modules 48. The system bus is designed to accommodate different types of memory modules having varying performance. However, the minimum number of cycles in a bus transaction will be seen as indicated in the Table I hereinunder.

TABLE I

SYSTEM BUS PERFORMANCE

| COMMAND | CYCLES | ACTIONS |
|---|---|---|
| Read Word | 3+ memory access | arbitration + command/ address + memory access + data return |
| Write Word Write SP, Read Lock | 3 | arbitration + command/ address + write data |
| Write Protect | 4+ memory access | arbitration + command/ address + write data + memory access + data return |
| Private Read, Shared Read | 6+ memory access | arbitration + command/ address + memory access + 4 word data return |
| Purge Block New Data Write | 7 | arbitration + command/ address + 4 write data cycles |
| Send Message | 7 | arbitration + message cmd/destination ID + 4 write data cycles |
| Read TOD (time of Day) | 3+ TOD access | arbitration + message cmd/destination ID + TOD access + TOD return |

BUS CHARACTERISTIC SUMMARY: The following summary of the system bus is indicated below in items (a) thru (m):

(a) The bus connects two central processing units having the IMP processor 28I (28I$_a$, 28I$_b$, FIG. 4A) or alternatively two central processing modules 8 having the CHAMP processor 28C (28C$_a$, 28C$_b$, FIG. 4B) which uses the Non-Store-Through (NST) cache memory unit, plus two interface modules (PMIU) designated 68$_a$ and 68$_b$ plus four memory modules 48$_a$ through 48$_d$. (FIGS. 1A, 1B). The IMP acronym refers to an "Integrated Mainframe Processor", while the CHAMP acronym refers to a CMOS Hardware A series Mainframe Processor".

(b) The system bus allows the IMP processor module (28I) to access memory on a "word" basis. Alternatively it permits the CHAMP processor module 28C and also the interface modules 68$_a$ and 68$_b$ (PMIU) to access memory on a 4-word block basis. The acronym PMIU refers to a Processor-Message Interface Unit, which has been given the shortened designation of an interbus interface module.

(c) The bus supports 4-word message transfers and also (TOD) time-of-day access between the IMP processor (or alternatively the CHAMP processor) modules and the interface modules 68$_a$ and 68$_b$ (PMIU).

(d) The bus (excluding power and ground) can carry a total of 98 signals which are divided into four groups as follows:

(i) arbitration signals;
(ii) command, address, and data transfer signals;
(iii) control/status signals;
(iv) miscellaneous signals such as the clock signal and reset signal.

(e) The system bus carries address signals and data signals which are multiplexed.

(f) The system bus provides for a data request and a data return in one signal bus transaction.

(g) The system bus provides for a central or a distributed arbitration system enabling a fairness scheme so as not to starve out any particular module. The arbitration is performed on every clock and concurrently with any current bus transaction. Each arbitration cycle will establish one bus transaction.

(h) Each "bus transaction" on the system bus can have one of the following requests (or transmit) phases:
(i) one command/address phase;
(ii) one command/address phase followed by one data phase;
(iii) one command/address phase followed by four data phases;
(iv) the data return (receive) phase will follow the request (transmit) phase if the requesting phase is expecting a data return.

(i) The command/address bus phase is always within one clock cycle. The data phases are executed within the minimum of one clock cycle but can be stretched to multiple clock cycles by asserting a signal called the Not Ready signal designated "NRDY".

(j) The system bus provides byte parity protection for various fields such as the command field, the address field, and the data field.

(k) The bus provides support for the transfer and identification of "corrupt" data (data which has errors).

(l) The bus supports a "retry" feature which is supported with a retry waiting period and a "retry limit" for error conditions and resolution of cache coherency.

(m) The system bus functions to provide a "time-out" limit on a bus busy signal designated as BBSY; it also provides for a signal designated Not Ready (NRDY) when a designated target module is not able to receive or transmit at a given moment in time.

BUS COMMUNICATION PROTOCOL: The system bus 22 provides a shared communication path to modules through a defined set of signals used for arbitration, for command/ address and data transfer and for control/status information. The bi-directional signals for command/address and data transfer are multiplexed.

MODULE TYPES: As seen in FIGS. 1A, 1B, the system bus 22 (22A, 22B) connects a total of eight modules. These include central processing module 8$_a$ having processor 28$_A$ and central processing module 8$_b$ having processor 28$_B$, plus two interbus memory interface modules (PMIU) 68$_a$ and 68$_b$, and four memory modules 48$_a$, 48$_b$, 48$_c$, and 48$_d$. The system bus 22 can support both types of cache environments such as the Store-Through (ST) and also the Non-Store-Through, (NST) cache environments. In both these type of environments, the memory modules 48 act as a server module while the interbus module (PMIU) 68$_a$ and 68$_b$ act as a "requestor" module on the bus. The processor modules 28A$_a$ and 28$_B$, however, can act as a requestor module in a Store-Through (ST) environment. In a Non-Store-Through (NST) environment, due to private Non-Store-Through (NST) caches, the processor modules and the requester and server module act as requestor modules. The requestor modules make use of the bus to access data and to transfer messages to each other. The "server modules" use the bus to transfer requested information to requestor modules.

When a module is requesting information to be returned to it, then it is called a "requester module". The "server modules", such as the memories 48, use the bus in order to transfer and give out requested information to requestor modules seeking such information.

COMMAND TYPES: There have been defined a set of commands for operation on the bus which are applicable to both the Store-Through (ST) and also the Non-Store-Through (NST) environments, thus allowing modules to communicate with each other. The "bus command set" can be categorized into two basic types:

(i) a memory type command and (ii) a message type command.

In a Store-Through (ST) environment, the memory type commands are targeted to memory modules and data is always accessed from the main memory either on a word basis or on a 4-word block basis. Some of the "Memory Write" type commands also cause ST (Store-Through) cache invalidations.

In a Non-Store-Through (NST) environment, the "memory type" commands are targeted to both memory modules and to the Non-Store-Through cache units on the processor modules. Data is accessed from either of the modules on a 4-word block basis only. Some of the "Memory Read" type commands will cause Non-Store-Through (NST) cache units to return data. Write type commands may cause cache unit invalidations to occur.

BUS PHASES: Communications on the system bus involves the following bus phases:

(a) Arbitration Phase;

(b) Transmit Phase;

(c) Receive Phase.

A "transaction on the bus" which depends on the bus command, is made up of the Arbitration Phase followed by either a Transmit Phase only, or both a Transmit and a Receive Phase. Table I indicated a set of commands and listed the number of cycles involved in the Transmit and Receive Phases associated with each command.

(a) Arbitration Phase: A transaction on the bus is established first through a bus arbitration phase. The bus arbiter 18 (FIGS. 1, 2) determines the next master control for the bus based upon current requests, the priority of requesters and previous bus grants. This phase of the bus transaction is overlapped with the end of either a transmit phase or a receive phase depending on the previous command executed. The bus arbiter 18 arbitrates on every clock and can issue a "bus grant" on each bus to two different requester modules, but the module receiving the grant does not drive the bus until the bus is available for the start of the next bus cycle.

In the A-11 computer system, the bus arbiter 18 may be in the central processing module such, as 8A and 8B, and FIG. 3, or it may be an independent module connected to the system busses as seen in FIGS. 1A, 1B. Several different configurations may be operative. In a "joined" system configuration only one bus arbiter 18 is enabled. However, in a "split" (partitioned) system as set up by Maintenance Processor 40p, both arbiter modules, such as 18$_a$ and 18$_b$ are active. The bus arbiter 18 maintains a 2-bit state relative to each bus request line. The state indicates if a particular requestor module is allowed to use system bus A, 22A only, or system bus B, 22B only, or both the busses or none of the busses.

Table II shows the bus arbiter state values for enabling each of the busses.

TABLE II

BUS ARBITERS STATE VALUES FOR ARBITRATION REQUESTS

| Enable Requestor | | | |
|---|---|---|---|
| Bus B | Bus A | Function | Action |
| 0 | 0 | No Grants Disabled | Requestor |
| 0 | 1 | Grant Bus A Only | Used in a split system or in a joined system with only one bus operational |
| 1 | 0 | Grant Bus B Only | |
| 1 | 1 | Grant both buses | Used in a joined system |

TABLE III A

BUS GRANT ARRANGEMENT IN A JOINED SYSTEM

| Bus Busy Condition | | Highest Priority | 2nd Highest |
|---|---|---|---|
| BBSYA | BBSYB | Requestor | Priority Req |
| Avail | Avail | Grant Bus A | Grant Bus B |
| Avail | Busy | Grant Bus A | Grant Bus B |
| Busy | Avail | Grant Bus B | Grant Bus A |
| Busy | Busy | Grant Bus B | Grant Bus A |

Table II indicates the various state values related to each bus request line thus, as seen in Table II, the situation can occur where there are no bus grants, or where there is only one bus which is granted for access or a situation, as in a joined system set up by Maintenance Processor 40p (FIG. 1), where both busses may be enabled for grant and use.

Table III-A shows the operations for bus grant in a joined system. Here it will be noted that when both busses A and B are available, the highest priority requestor will get a grant to bus A while the second highest priority requestor will get a grant to bus B. Likewise, if system bus A, 22A, is available while system bus B, 22B, is busy, the highest priority requester will be granted use of bus A. Likewise if only system bus B is available, then the highest priority requestor will be granted bus B.

EQUAL ACCESS ARBITRATION FAIRNESS SCHEME: All the requestor modules on the bus are given equal priority for usage of the system bus. The bus arbiter 18 implements the fairness scheme with a LRU (Least Recently Used) algorithm. The arbiter 18 keeps track of the usage of the system bus by different modules and gives a temporary higher priority to the least recently used module. The priority of the module winning the arbitration is lowered to allow other modules to gain access to the bus. An example of this fairness scheme is implemented as described in a commonly owned U.S. Pat. No. 5,644,733 entitled "Dual Coupled Partitionable Networks Providing Arbitration Logic for Managed Access to Commonly Shared Buses" which is incorporated herein by reference.

(b) Transmit Phase: The transmit phase, while depending on the bus command, consists of either a command/address cycle only or a command/address cycle followed by one or four data cycles. For "message type" commands, the address field in the command/address phase is replaced by a destination ID (Identity) field and the subsequent data words are replaced by message words.

The Transmit Phase follows the Arbitration Phase. If the requestor is granted the bus and the bus is available, the requestor starts driving the bus during this phase. The requester broadcasts the request information on the bus. The server modules on the bus decode the information to check to see if they are the target or destination for this request. If a module is the target of the bus operation, this module must "acknowledge" the request to indicate its responsibility to receive and process the request.

During, and at the end of, the Transmit Phase, while waiting to receive an acknowledge signal, the requestor also checks for a Not Ready signal (NRDY) and for a Bus Error signal condition from the server module. If it detects a Not Ready condition, then the requestor waits on the bus. If the requester detects an error condition, it aborts the current transmission and Retries its request.

If the requester is expecting data to be returned at the end of transmission, then a "Receive Phase" follows the transmit phase. In this case, the requestor, after receiving an acknowledgement for the Transmit Phase, turns its transceivers around and waits for the data return. The server module (memory) can start driving the bus anytime after asserting "acknowledge" for the request. The requester asserts the "Bus Busy" signal during this entire transaction, thus indicating to other modules that the bus is currently in use.

If the requestor is requesting a one-way transfer on the bus such as a "Message Transfer" or a "Write-To-Memory", (bus commands consisting of Transmit Phase only), the requester will stop driving the bus after transferring the last data word of the Transmit Phase and then make the bus available for other modules.

(c) Receive Phase: A Receive Phase, depending on the bus command, consists of either one or four data return cycles. After the server module (memory) has acknowledged and processed the request, the server module starts driving the bus. The requester, in this case, then becomes the receiving module. There is no acknowledgement signal provided from the requester for the Receive Phase.

DATA COHERENCY: Since the A-11 computer system operates in a multiprocessor environment, with each processor having its own type of cache unit (ST or NST), the shared data blocks in the cache units and in main memory must contain updated information so that the module does not access "stale" data. This requires "data coherency" between the cache units and the main memory.

The system busses 22A, 22B, in addition to providing a path for data access for various modules, also provides for modules to maintain consistent or coherent data. This is accomplished with "spy" logic which monitors the busses. The spy logic 29 (FIG. 2) monitors the system bus for commands that can cause either invalidation or expulsion of data from the cache unit. This type of spy or snooping system has been described U.S. Pat. No. 5,025,365 entitled "Hardware Implemented Cache Coherency Protocol With Duplicated Distributed Directories For High Performance Multi-Processors" and issued on Jun. 18, 1991, assigned to the same assignee as the present disclosure. This commonly owned U.S. Patent is incorporated herein by reference.

The dual system bus 22, supports both the Store-Through (ST) and a Non-Store-Through (NST) environments. Since the operations for data coherency are quite different in the ST and in the NST environments, then, in the dual processor format of the A-11 computer system, the dual system bus 22 will support either one of the two environments but not both at the same time. In the A-11 system, the IMP (28I) based processor (store-through cache, ST) will follow a Store-Through protocol, while another type of processor designated CHAMP (28C) will follow a Non-Store-Through (NST) protocol. The memories 48 and the interbus interface modules 68 (PMIU) are designed to follow a general protocol which is suited for supporting both the Store-Through and Non-Store-Through environments.

In a Store-Through (ST) mode, the Write commands from the requestor modules are always issued to the main memory 48 so that the memory module always has the updated information (master or original data). In order to maintain data coherency, the other modules on the bus containing cache units will monitor the bus for memory Writes and invalidate any copy of that correspondingly particular data that resides in their cache unit. FIG. 3 shows a schematic drawing of the central processing module 8 having various enabling circuitry and the processor 28. Included in the processor logic 6, is a cache unit $28_i$ for Store-Through-Cache and a cache unit $28_c$ for Non-Store-Through Cache. If the processor (Integrated Hairframe Processor) 28 is an IMP processor, 28I, then the cache unit $28_i$ is a Store-Through cache unit. On the other hand, if the processor 28 is a CHAMP (CMOS Hardward A series Mainframe Processor) processor, $28_c$, then the cache unit $28_c$ is a Non-Store-Through functioning unit.

In a Non-Store-Through (NST) environment, the concept of master/copy is used at a 4-word block level in order to maintain data coherency. In this arrangement, the "Writes" from the processor 28 are always done locally in the cache $28_c$ by acquiring a master (original) block either from the main memory 48 or from another Non-Store-Through (NST) cache unit in the system.

The request for a master block causes the cache unit $28_c$, FIG. 4B, holding the master block, to return the data to the requester and all other cache units to invalidate any existing copies. The requester, after acquiring a master block, keeps the block until it is purged out due to lack of space in the cache unit, or else is requested by another module in the system. The Reads from the processor 28 translate into a request for a copy of the block on the system bus. The module holding the master returns the master block to main memory 48 and provides a copy of the block to the requestor module.

There are certain basic rules for "data coherency" in a Non-Store-Through" (NST) environment. These include:
1. There can be only one master block in the system for each physical address at any time. A master block of data involves a four-word block of data which is original, valid data written into main memory. In the Non-Store Through (NST) environment, "copies" of this master block can be issued to requesting modules, but these copies cannot be overwritten.
2. After system initialization, the main memory 48 has all master blocks.
3. Copies of a master block are issued to requesting modules as long as the main memory 48 has the master block, with a provision that copies cannot be overwritten.
4. Writes are permitted only after ownership of a master has been obtained with the exception of New Data Writes from the interbus interface module $68_a$, $68_b$, (PMIU). When a module requests a master block, copies of the master block in other caches are invalidated. Thus, if the module requesting the master wishes to update the master, then of course, copies of the master in other caches must be invalidated and are done so.
5. A master block can be transferred to a requestor from main memory 48 or from another central processing module $8_a$, $8_b$.

6. The data blocks can move from one cache unit to another cache unit in a Non-Store-Through (NST) environment if the modules are contending for the same master block. In order to prevent the shuttling of blocks between the modules without accomplishing useful work, the requestor of a block first must "inhibit" other requesters from acquiring that same block by asserting the RETRY signal.

Once the master block has been obtained, the requestor continues to assert RETRY until after it has performed the desired operation on that block. This is part of the spying function of the module. After the module has performed the necessary operation, it will either release the block to the requestor on the following RETRY, or purge it back to main memory 48. In the latter case, the contending requestor will eventually get the block from main memory 48.

With there being two system busses in the A-11 computer system, the spying for the request (while inhibiting other requesters from making a request for the same block) will start on the same clock that the requestor is making a request. At the same time that the requestor is transmitting its request for the block, it is also watching the other system bus to see if another requestor is asking for the same block. If it finds another requestor seeking the same block, it asserts "RETRY" on the bus causing the other requestor to RETRY sometime later. In order to prevent a RETRY on both busses, causing both busses to back off, the requester on system bus A, 22A, is given higher priority.

The module requesting a block using system bus A and spying on system bus B will assert a "RETRY" on the system bus B. The module requesting on system bus B, and spying on system bus A, will not assert the RETRY signal. This will prevent a memory module 48 from processing two requests for the same block latched at the same time on two different busses.

The interbus interface module 68 (PMIU 68$_a$, 68$_b$) operates the same way in both the Store-Through (ST) and the Non-Store-Through (NST) environments. For full block updates (with "new data" coming from a peripheral-input operation), the interbus interface module 68 always Writes the block to main memory 48 causing the master block and any copies of the block in cache units to be invalidated. For partial block updates, the interbus module 68 maintains a 4-word block cache unit and acquires the master block in this cache unit. After performing the required function, the interbus module 68 immediately purges the block back to main memory.

The PMIU interbus interface module 68 starts spying on the bus on the same clock that it makes a request for a master data block. After acquiring the master block, and during the time it is holding the master, the interbus module 68 spies on both busses to see if another module is requesting the same block. The interbus interface module 68 (PMIU) stops spying after it has successfully purged the block back to main memory and received an acknowledge signal for it. The interbus interface module (PMIU) 68 has a cache unit 68$_c$, FIG. 1 which will operate differently from the central processor NST cache unit 28c in two ways:

(a) The interbus interface module 68 (PMIU) will not hold the master block after it has performed the desired operation on it, unlike processor NST cache units which continue to hold a master until it is purged or requested by another module;

(b) The interbus interface module 68 (PMIU) will not transfer a master set of date words directly to the requester. It will always return a master block back to main memory 48. The interbus interface module 68 will "inhibit" requests for the same block until after the block is returned to main memory 48.

SIGNAL DEFINITIONS: The system bus signals can be categorized into four groups:

(a) Arbitration signals (22$_a$, FIG. 2)

(b) Multiplexed command, address and data transfer signal (22$_d$, FIG. 2)

(c) Control/Status signals (22$_c$, 22$_s$, FIG. 2)

(d) Miscellaneous signals (22$_k$, FIG. 2)

All signals except bus request lines required for arbitration are duplicated on each bus. The bus request lines are shared by both busses.

(a) ARBITRATION SIGNALS:

(a1) Bus Request Signals (BREQ3_N, BREQ2_N, BREQ1_N, BREQ0_N)

Source: Processor and PMIU modules

Dest: Bus Arbiter

Polarity: Active Low; can be active for multiple clocks

Type: Unidirectional Transmit only for processor and PMIU modules Receive only for module containing Bus Arbiter A bus request line is dedicated to each module. The arbitration logic 18 monitors the bus request lines of all modules to determine the next bus master. There is only one set of request lines, shared by both system busses. In a joined configuration, the requestor is assigned a bus based on its priority and availability of the busses. In a split system each bus is dedicated to a particular partition group. The system arbiter will limit a requestor's system bus access to the bus assigned to that requestor's partition. The bus requestor keeps the "Bus Request" signal active until it detects Bus Grant (BGNTn) and bus free conditions, then drives the bus. The Bus Request is deactivated on the same clock the requestor gets to drive a command.

(a2) BUS GRANT SIGNALS (BGNT3_N, BGNT2_N, BGNT1_N, BGNT0_N)

Source: Bus Arbiter

Dest: Processor and PMIU modules

Polarity: Active Low; can be active for multiple clocks

Type: Unidirectional Receive only for processor and PMIU modules Transmit only for module containing Bus Arbiter Each module on the bus is provided with two dedicated bus grant lines (one for each bus 22A and 22B) from the arbitration logic 18. It indicates to the requestor that it has ownership of the bus on the following clock if the bus is "not busy". The requestor may get the bus grant in the same clock in which it makes a bus request, if no higher priority requestors are requesting the bus. Also the requesters who are granted the bus but unable to transmit requests on the bus due to a bus busy condition may lose their grant before the bus becomes free if any higher priority requestors are requesting the bus.

Since there are two busses in the system in a dual system configuration, the arbitration logic grants the selected requester the first bus that becomes available. In a split or partitioned system, the bus arbiter only grants, to a requester, the bus assigned to that requestor's partition. The bus arbiter keeps the bus grant signal active as long as the bus request (BREQn) signal from the requestor is active.

(a3) Bus Busy (BBSY_N)

Source: Bus Master module

Dest: Other Processor and PMIU modules

Polarity: Active Low; can be active for multiple clocks

Type: Bidirectional

The current bus master (module that has been granted bus access) asserts this signal to indicate a "Bus Busy" condition to other modules on the bus. The module asserts this signal on the clock following the detection of the bus grant and "Bus-Free" (not bus busy)conditions. The bus master module keeps the signal (Bus Busy) active during the entire transaction. If the bus transaction includes a request and a return phase, the module expecting a data return following a request phase will keep the bus busy condition active until it receives the requested information or detects bus error or retry bus conditions.

Each requester module monitoring "Bus Busy" condition and seeking to get on the bus, must be capable of timing out on this signal. If the signal is not deactivated after some large period of time specified by a time-out value, the module will report error to a Maintenance Processor $40_p$ (FIG. 1). The time-out value for the module will be set during the module initialization.

(b) COMMAND/ADDRESS AND DATA TRANSFER SIGNALS (b1) ADR_DATA (63:0) Signals

Source: Processor, PMIU (Processor Message Interface Unit) and memory modules

Dest: Processor, PMIU and memory modules

Polarity: Active High; command/address asserted for 1 clock only; data can be valid for multiple clock cycles Type: Bidirectional These bidirectional signals are used to transfer information such as commands, address and data between the modules on the bus. The signals multiplex the command/address phase with the data phase. A separate status signal on the bus "CMDVAL" differentiates the command/address phase from the data phases. In the "command" phase, it transfers either 32 bits of memory address or 32 bits of destination ID field and a command byte. In the "data" phase, it transfers either 6 bytes of E-Mode memory data or 6 bytes of message word and a 4-bit E-mode tag associated data or message word. Each byte of information on these lines is covered by a separate parity signal. The signal meanings for each phase are listed below in Table III-B.

TABLE III-B

SIGNAL MEANINGS FOR ADR_DATA (63:0) DURING COMNAND AND DATA PRASES

| BITS | COMMAND PHASE | DATA PHASE |
|---|---|---|
| 63:56 | unused | unused |
| 55:52 | unused | unused |
| 51:48 | Don't Care with valid parity | E-Mode data tag |
| 47:40 | Don't Care with valid parity | data/msg byte 5 (MSB) |
| 39:32 | command byte | data/msg byte 4 |
| 31:24 | address/destin ID byte 3(MSB) | data/msg byte 3 |
| 23:16 | address/destin ID byte 2 | data/msg byte 2 |
| 15:08 | address/destin ID byte 1 | data/msg byte 1 |
| 07:00 | address/destin ID byte 0(LSB) | data/msg byte 0 (LSB) |

(S1) BI-DIRECTIONAL LINES DURING COMMAND/ADDRESS (DESTINATION ID)

[31:0] Address (Destination ID) bits 0 to 31:

For memory type commands, these lines provide the 32 bits (4 bytes) of physical E-mode address. For message transfer commands (Send Message and Read TOD), these lines provide 32 bits of destination ID field.

Bits [7:00] are the least significant byte and bits [31:24] are the most significant byte of the address (or destination ID) field. The destination module ID is extracted from word 0 of the message block formed by the MCP (Master Control Program) during the External Function (XFUNC) operator. The E-Mode address refers to specialized E-Mode Systems which use microcode emulation of a set of operators. Thus much hardware formerly used to perform operators is replaced by microcode. Table IV shows four destination modules which can be coded to identify the destination module.

TABLE IV

DESTINATION ID FOR BUS REQUESTOR MODULES

| DESTINATION ID FIELD [03:00] | DESTINATION MODULE |
|---|---|
| Choice Open | Processor 0 |
| Choice Open | Processor 1 |
| Choice Open | PMIU 0 |
| Choice Open | PMIU 1 |

[39:32] Command field: These lines provide the encoding for the memory or message type command to be executed. Table V shows the Command Set for a Store-Through (ST) environment while Table VI shows the Command Set for a Non-Store Through (NST) environment.

TABLE V

COMMNND SET - STORE THROUGH ENVIRONMENT

| COMMAND | SOURCE | DEST |
|---|---|---|
| Read Word | IMP | Memory |
| Shared Read | PMIU | Memory |
| Private Read | PMIU | Memory |
| Write Word | IMP | Memory |
| Purge Block | PMIU | Memory |
| New Data Write | PMIU | Memory |
| Write SP Word | IMP | Memory |
| Write Protect Word | IMP | Memory |
| Read Lock | IMP | Memory |
| Read TOD | IMP | PMIU |
| Send Message | IMP, PMIU | IMP, PMIU |

TABLE VI

COMMAND SET - NON-STORE-THROUGH ENVIRONMENT

| COMMAND | SOURCE | DEST |
|---|---|---|
| Shared Read | CHAMP, PMIU | Memory, Cache |
| Private Read | CHAMP, PMIU | Memory, Cache |
| Purge Block | CHAMP, PMIU | Memory, Cache |
| New Data Write | PMIU | Memory |
| Read TOD | CHAMP | PMIU |
| Send Message | CHAMP, PMIU | CHAMP, PMIU |

Table VII is an illustration of the Command Encoding for the eleven Commands listed.

TABLE VII

COMMMAND ENCODING

| COMMAND | ENCODING | | | | | | | |
|---|---|---|---|---|---|---|---|---|
| | 39 C/M | 38 | 37 | 36 | 35 | 34 WD/ BL | 33 WR | 32* RD |
| Read Word (RDWD) | 0 | 0 | 0 | 0 | 0 | 0 | 0 | 1 |
| Shared Word(SR) | 0 | 0 | 0 | 0 | 0 | 1 | 0 | 1 |
| Private Read(PR) | 0 | 0 | 0 | 0 | 1 | 1 | 0 | 1 |
| Write Word (WRWD) | 0 | 0 | 0 | 0 | 0 | 0 | 1 | 0 |
| Purge Block (PURGE) | 0 | 0 | 0 | 0 | 0 | 1 | 1 | 0 |
| New Data Over Write (NDOW) | 0 | 0 | 0 | 0 | 1 | 1 | 1 | 0 |
| Write SP Word (WRSPWD) | 0 | 0 | 0 | 0 | 0 | 0 | 1 | 1 |
| Write Prot Word (WRPWD) | 0 | 0 | 0 | 0 | 1 | 0 | 1 | 1 |
| Read Lock(RDLK) | 0 | 0 | 0 | 1 | 0 | 0 | 1 | 1 |
| Read TOD(RTOD) | 1 | 0 | 0 | 0 | 0 | 0 | 0 | 1 |
| Send Message (SNDMSG) | 1 | 0 | 0 | 0 | 0 | 0 | 1 | 0 |

*NOTES: TABLE VII
Bit 32 - 1 Read only type command
Bit 33 - 1 Write only type command
Bit 34 = 0 Word level command
Bit 34 = 1 Block level command
Bit 39 = 0 Memory type commands
Bit 39 = 1 Message type commands (S2) BI-DIRECTIONAL LINES DURING DATA (MESSAGE) PHASE:

[47:0] Data (Message) word bits 0 to 47:

These lines (multiplexed with command/address lines) carry the 48 bits (6 bytes) of the E-mode data word for memory commands and 48 bits of message word for message type commands. Bits [7.0] mark the least significant byte and bits [47:40] mark the most significant byte of the data (message) word field.

[51:48] Data (Message) Tag Field: These lines carry the E-mode tag for data or message words transferred on lines [47:0]. For message words, the tag value is always zero.

[63:52] Unused (b2) PAR(7:0) SIGNALS (PARITY)

Source: Module driving the bus (Processor, PMIU, Memory)

Dest: Receiver modules (Processor, PMIU, Memory)

Polarity: Active High; command/address parity asserted for 1 clock only; data (message) parity must be valid while data is valid on the bus; covers ODD parity Type: Bidirectional These bidirectional signals carry odd parity on a byte level (the total number of 1's in the byte including parity must be odd) for signals on ADR_DATA(51:0) lines. During the command address phase, the signals cover parity for 32 bits of address or destination ID and command fields. During the data or message phase, it covers parity on 48 bits of data or message and 4 bits of tag. The signal meanings for each phase are listed below in Table VIII.

TABLE VIII

SIGNAL MEANING ON PAR (7:0)
DURING COMMAND AND DATA PHASES

| SIGNAL | COMMAND PHASE | DATA PHASE |
|---|---|---|
| PAR(7) | Unused | Unused |
| PAR(6) | Valid Parity | parity for data or message tag |
| nibble PAR(5) | Valid Parity | parity for data/msg byte 5 |
| PAR(4) | Parity for coinmand byte | parity for data/msg byte 4 |
| PAR(3) | Parity for address or destination ID byte 3. | parity for data/msg byte 3 |
| PAR(2) | parity for address or destination ID byte 2 | parity for data/msg byte 2 |
| PAR(1) | parity for address or destination ID byte 1 | parity for data/msg byte 1 |
| PAR(0) | parity for address or destination ID byte 0 | parity for data/msg byte 0 |

(c) CONTROL/STATUS SIGNALS
(c1) Command Valid (CMDVAL_N)
Source: Requestor modules (Processor, PMIU)
Dest: Target modules (Processor, PMIU, Memory)
Polarity: Active Low; asserted for 1 clock only
Type: Bidirectional for Processor and PMIU modules
Unidirectional for Memory modules (Receive only)

Since the ADR_DATA(63:0) multiplexes the command/address with data cycles, this signal is used to differentiate between these two cycles. The requestor asserts this signal to indicate to receivers that a valid command (memory or message type) and address (or destination ID) information is on the bus. The receiving modules, after detecting this signal, latch the command and address information of the bus and check to see if they are selected as a target. The modules selected as targets for the request continue to monitor the bus and receive further transmission if any. Other modules ignore the bus until they see CMDVAL_N again.

(c2) Not Ready (MM_NRDY_N,PE_NRDY_N)
Source: MM_NRDY_N:—memory modules; PE_NRDY_N:—processor and PMIU modules. The acronym MM refers to Main Memory, while the acronym PE refers to Processor Element.
Dest: Requestor and other targets (Processor, PMIU, Memory)
Polarity: Active Low; can be active for multiple clock cycles
Type: Bidirectional; Open Collector The server module (memory) on the bus asserts this signal to indicate to the requestor module that it is not ready for communication on the bus. It can be asserted only after the communication link between the modules on the bus is established.

When a requester makes a request, the receiving module or modules (including spy modules) on the bus can assert this signal only after having latched in the command and decoded the information to find that it has been selected as a target for the request. The signal is asserted any time after latching the command and before asserting acknowledge (MM_ACK_N or PE_ACK_N) or the receipt of the request. The requestor, after transmission, monitors the NRDY_N signal and delays further transmission accordingly. For the bus transactions containing only a command/address cycle in the transmit phase, this signal can be asserted to delay both acknowledgement or data/message transfers. The signal causes the requestor to either hold the current information (data or message word) on the bus if it has already begun transmission or delay it until the module goes ready again.

In the case when the request has multiple targets (e.g. a Private Read request has both memory and processors as targets), a target that is not asserting NRDY_N must monitor the signal to see if another target has asserted the signal and must delay its acknowledgement signal accordingly.

The bus interface logic on each module latches the NRDY_N signal before deciding to transmit. Therefore, the transmitter will hold or change information on the bus on the clock following the detection of a Not Ready or a Ready condition.

The memory module 48 uses this signal to delay the acknowledgement of an MM_ACK_N signal and to control the flow of write-data words coming from the requestors. The processor modules will use this signal to delay the acknowledgement signal PE_ACK, if more time is needed to determine if the requested information is in cache; and, to control the flow of invalidation requests, (a deadlock condition can occur if two IMP based processors are writing to memory, both have their invalidation queue full, and both go "not ready" on each other) and to control the flow of message words from PMIU modules $68_a$, $68_b$. The PMIU modules will use this signal to control the flow of message words returned from the processor or other PMIU modules.

The NRDY_N signal can not be used in the receive phase of the bus transaction to delay data return words coming from either memory or cache. Once the requester has made request for the data, it must take data words at memory or cache speed.

Each module on the bus monitoring the NRDY_N signal (these modules are target modules that did not assert NRDY and did not acknowledge the requestor module) must be capable of Timing Out on the signal. If the signal is not deactivated after some large period of time specified by a (settable time-out value, the module reports error to the Maintenance Processor $40_p$. The time-out value is set during module initialization.

This signal (NRDY_N) cannot be used to delay or hold the command/address cycle of the transmission. It mainly provides the control for the server module (memory) to delay the request processing (once it is accepted) and delay transmission of data words from the requester. Also with two system busses in the network, there can be a deadlock condition when two requestors send requests at the same time on two different busses and go "Not Ready" on each other. The requester on System Bus A is given higher priority. The requestor on bus B will back off and retry its request later. This scheme will cause only one requestor (on System Bus B) to back off.

(c3) Data Valid (DATAVAL_N)
　Source: Transmitter module of data or message words (Processor, PMIU, Memory)
　Dest: Receiver module of data or message words (Processor, PMIU, Memory)
　Polarity: Active Low; asserted while information is valid on the bus
　Type: Bidirectional The modules on the bus assert this signal to indicate to the receiver that the current information on the bus ADR_DATA(63:0) and PAR(7:0) is valid. The receiver uses the DATAVAL_N signal to latch data or message words on the bus. The signal can be asserted only during data or message word transfers on the transmit and receive phases. It also allows the Transmitter module to control the pace of transmission when sending data or message words. If the Receiver goes "Not Ready" while the transmitter is driving valid data on the bus, the transmitter will hold information on the bus (with DATAVAL_N asserted) for consecutive cycles until the receiver goes Ready again.

(c4) Memory Acknowledge (MM_ACK_N)
　Source: Memory modules
　Dest: Memory Requestor (Processor, PMIU)
　Polarity: Active Low; asserted for 1 clock only
　Type: Unidirectional; common to all memory modules
　　Transmit only for memory modules Receive only for Processor and PMIU modules The memory modules 48 assert this common memory "Acknowledge" signal to acknowledge the receipt of the transmission, and indicate to the requester, possession of the requested information and responsibility for processing the request. The memory module can assert this signal only after decoding the command and address mapping information and determining that it is the target of the request. The signal is asserted in the 2nd clock (if not delayed by NRDY) following the end of a transmit phase. The transmit phase may include only the command/address cycle for memory read requests, a command/address cycle followed by a data cycle for 1 word Memory Write requests or a command/ address cycle followed by four data cycles for 4 word Memory Write requests.

If the memory module is busy processing other requests and cannot assert MM_ACK_N in the 2nd clock following the transmit phase, it can go Not Ready in the clock following the end of the transmit phase and delay MM_ACK_N. In this case, the MM_ACK-N signal is asserted in the clock after the memory module becomes Ready again. Also in the case where the memory module is ready to process the request but some other target (such as a processor's cache invalidation logic or NST cache) is not ready to process, the memory module will monitor the NRDY_N signal and delay its MM_ACK_N accordingly until it recognizes the Ready signal again.

If a memory module receives valid command and address fields but the address does not map on to the memory module, it will stop receiving information from the bus and will not assert the acknowledgement signal.

If the requestor drives an address that does not map into any of the memory modules of the NST caches of the CHAMP 28c processor modules on the bus, the requestor will not see either MM_ACK_N or PE_ACK_N and interprets the lack of any acknowledgement signals as an invalid address.

The memory module can drive requested information on the bus any time after asserting MM_ACK_N. The requestor, after detecting MM_ACK_N, turns its transceivers around to receive information on the bus.

Acknowledgement is given for the whole transmit phase or transmission packet and not for individual cycles in the transmit phase. Also there is no acknowledgement for the receive phase, that is, when memory is returning requested information, the requestor does not acknowledge.

(c5) Processing Element Acknowledge (PE_ACK_N)
　Source: Processor (CHAMP) containing NST cache, PMIU modules
　Dest: Memory/NST Cache Requestor (Processor, PMIU)
　Polarity: Active Low; asserted for 1 clock only
　Type: Bidirectional for Processor and PMIU modules
　　Unidirectional (Receive only) for memory modules The processor (CHAMP) containing a private NST cache, and the PMIU modules (68a, 68b) assert this common processing element "Acknowledge" signal to acknowledge the receipt of the transmission and indicate to the requestor that it has the requested information and is responsible for processing the request.

The processor module asserts this signal for both memory commands (Private Read, Shared Read) and message type (Send Message) commands while the PMIU module asserts it only for message type (Read TOD, Send Message) commands. For memory type commands, the processor asserts "Acknowledge" after decoding the request and checking the cache tag directory to see if the requested information is in the local cache. For message type commands, the modules assert "Acknowledge" after decoding the message command and destination ID to see if they are the target for the request. The signal is asserted in the 2nd clock (if not delayed by NRDY) following the end of a transmit phase.

If the target module is busy or needs more time to check the cache tag directory or process a message request, and cannot assert PE_ACK_N in the 2nd clock following the transmit phase, it can go Not Ready in the clock following the end of transmit phase and delay the acknowledge response. In this case, the PE_ACK_N signal is asserted in the clock after the processor module goes Ready again. Also in the case where there are multiple targets for the request and one target is ready but the other target is not ready to process the operation, the target that is ready to process will monitor the NRDY_N signal and delay its PE_ACK_N accordingly until it sees Ready again. For example, a Private Read request has both processor and memory as targets and if the processor is ready but memory is not ready to process the operation, the processor will monitor RDY_N and delay PE_ACK_N accordingly.

For memory type commands, if the processor receives valid command and address fields but the address is not located in the cache tag directory, it will not assert acknowledge. For message type commands, if the destination ID does not match the module's ID, the module will not assert acknowledge.

If the requestor drives an address that does not map in any of the NST caches on any processor module or in any memory module, the requestor will not see either PE_ACK or MM_ACK and interprets the lack of any acknowledge signal as an invalid address.

The target module can drive requested information on the bus any time after asserting PE_ACK_N. The requester, after detecting PE_ACK_N, turns its transceivers around to receive information on the bus.

The acknowledge is asserted once for the whole transmit phase or transmission packet and not for individual cycles in the transmit phase. Also there is no acknowledgement for the receive phase, that is, when the processor or PMIU is returning requested information, the requester does not acknowledge.

PE_ACK_N causes a memory module to ignore or abort the processing of the request associated with the same bus cycle, since the processing element concurrently targeted as receiver will now fulfill the request.

(c6) Retry (RETRY_N)

Source: Receiver of the request transmission (Processor, Memory, PMIU)

Dest: Requestor (Processor, PMIU) and other targets that monitor bus

Polarity: Active Low; asserted for 1 clock only

Type: Bidirectional (Open Collector)

The signal is asserted by the receiver of the request to indicate to the requestor to abort the current transmission and retry its request. The retry is asserted by a module in the following cases:

1. Detection of a parity error on the address or destination ID field; multiple modules can assert this error since all of them receive the command/address cycle;
2. Detection of a parity error on the command field;
3. Detection of a parity error on the data field and the address or destination ID field has confirmed the module to be a target;
4. Detection of other module related internal errors when receiving transmission and the address or destination ID field has confirmed the module to be a target;
5. If the module is currently busy (queue full condition or spy logic) processing other requests and the address or destination ID field confirms the module as a target;

The signal is asserted by the module in the 2nd clock following a command/address cycle, data or message transfer cycles. The signal causes a requestor to wait for a certain amount of time (specified by the retry waiting period), contend for the bus again and retry its request.

The retry signal is asserted both for handling error situations and resolving data coherency. However, with the error conditions, the Bus Error signal is also asserted. This distinguishes the two cases of retry situations.

In a case where the request has multiple targets (e.g. Private Read request has memory and processor as targets), the target that is not asserting RETRY_N must monitor the signal to see if another target has asserted the signal. All targets involved in a RETRY_N bus cycle will ignore the entire transmission.

Each requester on the bus maintains two states related to the retry features. These are Retry Waiting Period and Retry Limit. The Retry Waiting Period specifies the amount of time the requestor must wait before retrying its request. The Retry Limit keeps track of the number of retries performed by the requestor for a particular request and the maximum number of retries allowed before reporting an error to the originator of the request or the Maintenance Processor $40_p$. The Retry Waiting Period and Retry Limit values are programmable and can be set to a fixed value during the initialization process. The Retry Limit is reset to its initial value every time a new request is made on the bus and the retry limit is decremented for each retry of that request.

The value of the Retry Waiting Period to be set can be adjusted to various situations. If the retry feature is used to solve some of the deadlock situations on the bus, then different modules can be set with different Retry Waiting Period values so that they do not try their requests again at the same time. Another solution is to use random number generator logic for the Retry Waiting Period and to initialize each module with different seed values.

The Retry Limit can be set to some high number within any MCP (Master Control Program) time-out limit, allowing a requestor to perform a sufficient number of retries before reporting an error t o the Maintenance Processor, $40_p$.

In an NST PE (Non-Store-Through Processing Element) environment where the master data block is in the PE transmit queue, asserting retry could result in a "deadlock" condition if the requested master block is forced to wait on the successful transmission of its previous request (which could be receiving retry from another PE because the master it is requesting, is in the queue). Therefore, the hardware on an NST PE must be implemented to either support direct access of the master from queue or separate queues for purges and requests, or out of order transmission of requests.

The retry feature is not supported for a "receive phase" (data return phase) of bus transaction for the following reasons:

1. To allow overlapping of a current bus transaction (last word of data transfer) with the arbitration of the next bus master and the start of the next bus transaction on the following clock.

2. In a ST environment, where a master data block is always read from the main memory (assuming that the memory does not keep a 'valid', 'invalid' state for the block). If the requestor detects an error on data returned from memory, it can retry the whole transaction and read the master again.

3. However, in an NST environment, this scheme may not work as the master may be transferred from the NST cache of another processor. If the retry feature is supported in the receive phase and if the requester detects an error on the first three words of data transfer, it can assert retry and cause cache to transfer the master block again. However, if the system bus interface logic forwards data to the CPU/Cache in parallel with receiving information on the bus, then since part of the block is already transferred to the CPU/Cache, the rest of the block needs to be transferred with the "data corrupt" signal. When the requestor retries the request and gets the master block again, it needs to overwrite the previous master block sent to CPU/Cache. The CPU/Cache needs to support this feature. If an error is detected on the fourth data word, the next bus transaction has already begun. The NST cache that returned the block must also change its internal state for the block as 'Not Present' and at this point it is too late to assert retry to cause the cache to transmit again. If the requestor tries to retry the whole transaction (since the cache does not have the block) a stale data block will be returned by the memory module.

The simple option for the requester in an NST environment is to receive data words without causing memory or other caches to retry the transmission and set the data corrupt signal for the ultimate destination—CPU/Cache or PMIU logic. At some later point, when the CPU or PMIU logic accesses the corrupted word, it will abort the operation.

(c7) Bus Error (BERR_N)

Source: Target and spying modules (Processor, Memory, PMIU)

Dest: Requestor (Processor, PMIU) and other targets that monitor bus

Polarity: Active Low; asserted for 1 clock only type: Bidirectional (Open Collector)

The signal is asserted by the receiver modules, including spy modules to indicate to the requester of an error in the previous bus transmission. It causes the requestor to abort transmission of its request. The signal is asserted by a module if it detects:

1. A parity error on address or destination ID field; multiple modules can assert this error since all of them receive the command/address cycle;
2. A parity error on the command field;
3. A parity error on the data field and the address or destination ID field has confirmed the module as a target;
4. Other module related internal errors when receiving a transmission and the address or destination ID field has confirmed the module as a target.

The Bus Error signal is asserted by the module in the 2nd clock following the command/address cycle, the data cycle or the message transfer cycle. If the retry signal is asserted along with Bus Error, it will cause the requestor to wait for a certain amount of time (specified by the retry waiting period), contend for the bus and retry its request.

(c8) Corrupted Data (CORRPT_DATA_N)

Source: Modules driving data or message words (Processor, Memory, PMIU)

Dest: Receiver modules (Processor, Memory, PMIU)

Polarity: Active Low; asserted while data or message word is valid on the bus

Type: Bidirectional

This signal has meaning only in the data or message transfer phases and is ignored by the modules during the command/address phase. This signal, when asserted during the data or message phase, indicates to the receiver that the data or message word on the bus is corrupted. The signal is asserted along with DATAVAL_N and information on the bus. The module or unit that detects an error in a data word sets this bit and transfers the word onto its destination. It also reports this error to the maintenance processor. The receiver of this data continues operation as normal and does not report this error to the maintenance processor.

(c9) Corrupt Data Parity (CPARITY)

Source: Modules driving CORRUPT_DATA_N signal (Processor, Memory, PMIU)

Dest: Receiver modules (Processor, Memory, PMIU)

Polarity: Inverted Corrupt Data signal; valid while data is valid on the bus

Type: Bidirectional

This signal caries inverted CORRUPT_DATA_N signal and has meaning only in data or message transfer phases.

(d) Miscellaneous signals:

(d) SYSTEM CLOCK (CLOCK)

Source: Maintenance processor

Dest: All modules on the bus (Processor, PMIU, Memory)

Polarity: 16 Mhz

Type: Unidirectional

The modules on the system bus synchronize their operations to the system clock.

(d2) SYSTEM RESET (RESET)

Source: Maintenance processor

Dest: All modules on the bus (Processor, PMIU, Memory)

Polarity: Active Low

Type: Unidirectional

When the signal is active, all modules on the bus reset their system bus interface logic. The current bus activity and pending requests at the bus interface are aborted.

(d3) MICRO SECOND CLOCK (CLK_2.4 S)

Source: Maintenance processor

Dest: PMIU modules

Polarity: 2.4 s (micro seconds)

Type: Unidirectional

The PMIU modules uses this clock to update and maintain a TOD (Time of Day) counter. The TOD information returned to the requestor (MCP) is in the units of 2.4 microseconds.

(d4) 512 MICRO SECOND CLOCK (CLK_512 s)

Source: Maintenance processor

Dest: Processor modules

Polarity: 512 s (micro seconds)

Type: Unidirectional

COMMAND DESCRIPTION: The following commands are listed and described operationally for enablement on the system busses 22A, 22B:

READ WORD (RDWD)

Source: IMP based processor modules

Dest: Memory module

Type: ST, memory type, request followed by 1 word data return

Cycles: Transmit Phase: 1 Receive Phase: 1

Processor: The IMP based processor module issues this command on the bus to fetch 1 word of data (or code) from the memory module. After transmitting the request, the requester waits on the bus for either an acknowledge followed by the requested information (DATACVAL_N) or for Not Ready or Bus Error or Retry conditions. If the processor has requested a code word, it will check for a valid code tag (tag=3) after receiving the word.

Memory: After receiving the request, one of the memory modules containing the requested information acknowledges the request. When memory has finished processing the request, it asserts dataval and transfers the information to the requestor. If the memory module detects any uncorrectable errors while processing the request (after it has asserted acknowledge on the bus), it asserts the data corrupt signal along with dataval and corrupted data.

PMIU: The PMIU module does not issue this command, but spies on the bus for this command. If it is holding the requested information as a master, it will assert retry causing the memory module to abort processing and causing the processor module to retry its request to the PMIU module.

WRITE WORD (WRWD)

Source: IMP based processor modules

Dest: Memory module

Type: ST, memory type, request only (one way transfer)

Cycles: Transmit Phase: 2 Receive Phase: 0

Processor: The IMP based processor module issues this command on the bus to write 1 word of data into the memory module. the 1 word of data to be written into memory follows the command/address cycle. After transmitting the request, the requestor waits on the bus for either acknowledgement or Not Ready or Bus Error or Retry conditions. The other processor module's spy logic monitors the system bus for this command and issues invalidations to its ST cache.

Memory: After receiving the request, one of the memory modules containing the requested address acknowledges the request on the bus. It causes a memory module to unconditionally write (overwrite) the data word at the requested address. If the memory module detects a data parity error on the data word sent by the IMP or runs into any internal processing errors while processing the request (after it has asserted acknowledge on the bus), it writes data into the memory with the data corrupt bit on.

PMIU: The PMIU module does not issue this command, but spies on the bus for this command. If the PMIU is holding the master of the requested information, it will assert retry causing the memory module to abort processing and causing the processor module to retry its request to the PMIU.

WRITE PROTECT WORD (WRPWD); WRITE SINGLE PRECISION WORD (WRSPWD)

Source: IMP based processor modules

Dest: Memory module

Type: ST, memory type, request followed by 1 word data return

Cycles: Transmit Phase: 2 Receive Phase: 1

Processor: The IMP based module issues this command on the bus to write 1 word of data to the memory module conditionally and return the initial contents of the addressed location (optional if no tag error). The 1 word of data to be written in memory follows after the command/address cycle. After transmitting the request, the requestor waits on the bus for either an acknowledgement followed by the requested information along with ETAG_ER or Not Ready or Bus Error or Retry conditions. The other processor module's spy logic monitors the system bus for this command and issues invalidations to its ST cache.

Memory: After receiving the request, one of the memory modules containing the requested address acknowledges the request on the bus. It causes a memory module to read the data at the requested address and to write new information from the processor only if the data tag for the word read satisfies the E-Mode protection requirement. When memory has finished processing the request, it asserts dataval and transfers the original contents of the addressed location to the requester. If the data tag for the word read does not meet E-Mode protection criteria, the memory module also asserts ETAG_ERR signal along with dataval and requested data word. The transfer of the original contents of memory is optional if the tag is ok as long as dataval and unknown data with good parity are driven on the bus. If a memory module detects any uncorrectable errors (other than the E mode tag match error) while processing the request (after it has asserted acknowledge on the bus), it asserts the data corrupt signal along with dataval and corrupted data.

PMIU: The PMIU module does not issue this command, but spies on the bus for this command. If it is holding the master of the requested information, it will assert retry causing the memory module to abort processing and the processor module to retry its request.

READ LOCK (RDLK)

Source: IMP based processor modules

Dest: Memory module

Type: ST, memory type, request followed by 1 word data return

Cycles: Transmit Phase: 2 Receive Phase: 1

Processor: The IMP based processor module issues this command on the bus to perform an indivisible operation to store a value into a word and return original contents. The processor supplies the data word to be written in memory and requests the original contents of the addressed location. The 1 word of data to be written in memory is transmitted following the command/address cycle. After transmitting the request, the requestor waits on the bus for either an acknowledgement followed by the requested information or a Not Ready or a Bus Error or a Retry conditions. The other processor module's spy logic monitors the system bus for this command and issues invalidations to its ST cache.

Memory: After receiving the request, one of the memory modules containing the requested address acknowledges the request on the bus. It causes the memory module to read the data at the requested address and to write new information from the processor only if the data tag for the word read satisfies the E-Mode protection requirement. The memory module must perform the operation: read followed by write, indivisibly.

When memory has finished processing the request, it asserts dataval and transfers the initial contents of the addressed location to the requestor. If the data tag for the word read does not meet E-Mode protection criteria, the memory module also asserts ETAG_ERR signal along with dataval and requested data word and aborts the store part of the cycle. If the memory module detects any uncorrectable errors while processing the request (after it has asserted acknowledge on the bus), it asserts the data corrupt signal along with the dataval signal and the corrupted data.

PRIVATE READ (PR)

Source: CHAMP processor (with NST cache) and PMIU modules

Dest: Memory or CHAMP processor (with NST cache) modules

Type: Used by PMIU in both ST and NST environments, used by processor modules in NST environment only, memory type, request followed by 4 word data return Cycles: Transmit Phase: 1 Receive Phase: 4

Processor: The CHAMP based processor with its NST cache issues this command on the bus to fetch a 4-word block of data as a master from either the memory module or another processor module's NST cache. After transmitting the request, the requestor waits on the bus for either acknowledge (MM_ACK or PE_ACK) followed by the requested information (dataval) or a Not Ready or a Bus Error or a Retry condition.

The processor module's spy logic monitors the system bus for this command either from the PMIU or the other processor module. If the spying processor module has a ST cache, the spy logic issues invalidation to its cache. If it has NST cache and the requested block is resident in the cache, the spy logic issues a request for a master block to the cache. When the NST cache has finished processing the request, it transfers the 4-word block one word at a time with the requested word in the block first. The cache asserts dataval for each word transferred to the requestor. If the cache detects any uncorrectable errors while processing the request (after it has asserted acknowledge on the bus), it asserts the data corrupt signal along with dataval for corrupted data word in the clock.

Memory: After receiving the request, one of the memory modules containing the requested information acknowledges the request. If the memory module detects PE_ACK from the processor module indicating that the NST cache has the block, it aborts processing of the request. When memory has finished processing the request, it transfers the 4-word block one word at a time with the requested word in the block first. The memory asserts dataval for each word transferred to the requester. If the memory module detects any uncorrectable errors while processing the request (after it has asserted acknowledge on the bus), it asserts the data corrupt signal along with dataval for the corrupted data word in the block.

PMIU: The PMIU module issues this command on the bus to fetch a 4-word block of data as a master from either the memory module or a processor module's NST cache. After transmitting the request, the requestor waits on the bus for either acknowledge (MM_ACK or PE_ACK) followed by requested information (dataval) or Not ready or Bus Error or Retry conditions. The PMIU module's spy logic monitors the system bus for this command either from the processor or other PMIU modules. If the spying PMIU is holding the block as a master, it will assert retry causing a memory module to abort processing and a processor module to retry its request.

SHARED READ (SR)

Source: CHAMP processor (with NST cache) and PMIU modules

Dest: Memory or CHAMP processor (with NST cache) modules

Type: Used by PMIU in both ST and NST environments, used by processor modules in NST environments only, memory type, request followed by 4-word data return Cycles: Transmit Phase: 1 Receive Phase: 4

Processor: The CHAMP based processor with a NST cache issues this command on the bus to fetch a 4-word block of data (or code) as a copy from either the memory module or another processor module's NST cache. After transmitting the request, the requestor waits on the bus for either acknowledgement: MM_ACK or PE_ACK, followed by the requested information (dataval) or Not ready or Bus Error or Retry conditions. The processor will check for a valid code tag (tag=3) since it uses a word out of the code block.

The processor module's spy logic monitors the system bus for this command either from the PMIU or another processor module. If the spying processor module has an ST cache, the spy logic ignores the command. If it has NST cache and the requested block is resident in the cache as master, the spy logic issues a request for a copy of a block to the cache. When the NST cache has finished processing the request, it transfers the 4-word block, one word at a time with the requested word in the block first. The cache asserts dataval for each word transferred to the requestor. If the cache detects any uncorrectable errors while processing the request (after it has asserted acknowledge on the bus) it asserts the data corrupt signal along with dataval for corrupted data word in the block. After the cache has transferred a copy block to the requestor, it purges the master block back to the main memory. The copy and master blocks are transferred in two separate transactions on the system bus.

Memory: After receiving the request, one of the memory modules containing the requested information acknowledges the request. If the memory module detects PE_ACK from the processor module indicating the NST cache has the master, it aborts processing of the request. When memory has finished processing the request, it transfers the 4-word block, one word at a time with the requested word in the block first. The memory asserts dataval for each word transferred to the requestor. If a memory module detects any uncorrectable errors while processing the request (after it has asserted acknowledge on the bus), it asserts the data corrupt signal along with dataval for the corrupted data word in the block.

PMIU: The PMIU module issues this command on the bus to fetch a 4-word block of data as a copy block from either the memory module or processor module's NST cache. After transmitting the request, the requester waits on the bus for either acknowledgement (MM_ACK or PE_ACK) followed by the requested information (dataval) or Not ready or Bus Error or Retry conditions.

The PMIU module's spy logic monitors the system bus for this command either from the processor or other PMIU modules. If the spying PMIU is holding the block as a master, it will assert retry causing the memory module to abort processing and causing a processor module to retry its request to the PMIU holding the block.

NEW DATA OVER WRITE (NDOW)

Source: PMIU modules

Dest: Memory modules

Type: Used by PMIU in both ST and NST environments, memory type, request only (one way transfer)

Cycles: Transmit Phase: 5 Receive Phase: 0

Processor: The processor module does not issue this command, but spies on the bus for this command. It causes the processor module's spy logic to invalidate any master or copy blocks present in its ST or NST cache.

Memory: After receiving the request, one of the memory modules containing the requested address acknowledges the request on the bus. The command causes the memory module to unconditionally write (overwrite) the master block at the requested address. If a memory module detects any uncorrectable errors while processing the request (after it has asserted acknowledge on the bus), it writes data into the memory with data corrupt bit on, for the corrupted data word in the block.

PMIU: The PMIU module issues this command on the bus to write a new master block (read from peripheral device) in to the main memory. The 4-word block to be written in memory follows a command/address cycle. After transmitting the request, the requestor waits on the bus for either acknowledgement or Not Ready or Bus Error or Retry conditions.

The other PMIU module's spy logic monitors the system bus for this command. If the spying PMIU is holding the block as a master, it will assert retry causing the memory module to abort processing and the PMIU module to retry its request to the other PMIU module.

The memory module interprets New Data and Purge Block requests in the same way, that is, updating the requested location with new information. The difference is however, on the System Bus where the New Data request causes cache invalidations to occur while the Purge Block is ignored by the spying modules. The Purge Block does not cause invalidations because invalidations for that block already occurred before when the module purging the block requested the master using Private Read request.

PURGE BLOCK (PURGE)

Source: CHAMP processor (with NST cache) and PMIU modules.

Dest: Memory modules

Type: Used by PMIU in both ST and NST environments, used by processor modules in NST environment only, memory type, request only (one way transfer)

Cycles: Transmit Phase: 5 Receive Phase: 0

Processor: The CHAMP based processor with an NST cache issues this command on the bus to return a master block back to main memory. The processor returns the master to make room in the cache to load another block. The 4-word block to be written in memory follows the command/address cycle. After transmitting the request, the requester waits on the bus for either Acknowledge or Not Ready or Bus Error or Retry conditions.

The other processor module's spy logic ignores this command.

Memory: After receiving the request, one of the memory modules containing the requested address acknowledges the request on the bus. The command causes the memory module to unconditionally write (overwrite) the master block at the requested address. If the memory module detects any uncorrectable errors while processing the request (after it has asserted acknowledge on the bus), it writes data into memory with the data corrupt bit on for the corrupted data word in the block.

PMIU: The PMIU module issues this command on the bus to return a master block back to main memory after it has acquired the block using a Private Read request. The 4-word block to be written in memory follows the command/address cycle. After transmitting the request, the requestor waits on the bus for either acknowledgement or Not Ready or Bus Error or Retry conditions. The spying PMIU module ignores this system bus command.

READ TIME OF DATA (RTOD)

Source: IMP or CHAMP processor

Dest: PMIU modules

Type: Message type, request followed by 1 word time-of-day data return

Cycles: Transmit Phase: 1 Receive Phase: 1

Processor: The processor modules issue this message command on the bus to request time-of-day (TOD) information, maintained by the PMIU module in the system. The processor drives destination ID instead of an address, specifying which PMIU is to return the requested information. After transmitting the request, the requestor waits on the bus for either acknowledge followed by requested information (dataval) or Not Ready or Bus Error or Retry conditions. The other processor module's spy logic ignores this command. If the processor drives a non-existent destination ID or if the destination ID is corrupted, it will not receive acknowledgement from any of the PMIU's and will retry its request.

Memory: The memory modules ignore this command.

PMIU: The PMIU module does not issue this command, but instead processes the request for TOD from processor modules. After receiving the request, one of the PMIU modules, whose destination ID matches, acknowledges the request. When the PMIU has finished processing the request, it asserts dataval and transfers the TOD information to the requestor. If the PMIU module detects any errors while processing the request (after it has asserted acknowledge ont he bus), it asserts the data corrupt signal along with dataval and corrupted TOD. The other PMIU whose destination does not match ignores this command.

SEND MESSAGE (SNDMSG)

Source: Processor and PMIU modules

Dest: Processor and PMIU modules

Type: Message type, request only (one way transfer)

Cycles: Transmit Phase: 5 Receive Phase: 0

Processor: The processor modules issue this message command on the bus to send messages to the PMIU modules. The processor drives a destination ID instead of an address, specifying which PMIU is to receive the message information. After transmitting the request, the processor waits on the bus for either acknowledgement or Not Ready or Bus Error or Retry conditions. If the processor drives a non-existent destination ID or if the destination ID is corrupted, it will not receive acknowledgement from any of the PMIUs and will retry its request.

A processor module that receives the message request from a PMIU, matches its destination ID and acknowledges the request. If a processor module detects any errors while processing the request (after it has asserted acknowledge on the bus), it writes or sends the information to its ultimate destination with the data corrupt bit on. The other processor module, whose destination ID does not match, ignores this command.

Memory: The memory modules ignore this command.

PMIU: The PMIU module issues this command on the bus to send messages to processor modules. The PMIU drives the destination ID instead of an address, specifying which processor is to receive the message information. After transmitting the request, the PMIU waits on the bus for either acknowledgement or Not Ready or Bus Error or Retry conditions. If the PMIU drives a nonexistent destination ID or if the destination ID is corrupted, it will not receive acknowledgement from any of the processor modules and will retry its request. PMIU modules that receive a message request from the processor, match their destination ID and acknowledge the request. If a PMIU module detects any errors while processing the request (after it has asserted acknowledge on the bus), it writes or sends the information to its ultimate destination with the data corrupt bit on. The other PMIU whose destination does not match ignores this command.

Described herein has been a network arrangement wherein a specialized dual system architecture and common protocol enables the dual system busses to support processor networks with Store-Through Cache memory or alternatively to support processor networks with Non-Store-Through Cache Memory thus providing flexibility of architectural choices in addition providing redundancy of communication lines due to the duplicate nature of each set of system busses.

Although one preferred embodiment has been described, it should be understood that the invention is encompassed by embodiments defined by the following claims.

What is claimed is:

1. A dual system bus network having a common bus protocol operable for processor modules using Store-Through (ST) cache memory units and for processor modules using Non-Store-Through (NST) cache memory units, said network comprising:
   (a) first and second system bus means, said second system bus means being a duplicate of said first bus means and each said bus means including:
      (a1) connection means to a plurality of digital modules and to a plurality of interbus interface module means;
      (a2) a plurality of digital data transfer lines including:
         (i) a line for multiplexing transfer of destination addresses, commands and data;
         (ii) a line for control signals;
         (iii) a line for status information transfer;
         (iv) a line for arbitration signals to determine priority of bus access;
         (v) a line for common clock signals;
   (b) said plurality of digital modules including:
      (b1) first and second processor modules having respective first and second Store-Through cache memory units;
      (b2) main memory module means for storing addressable data;
      (b3) said first and second interface module means providing an interface to first and second input/output modules;
      (b4) third and fourth processor modules having respective Non-Store-Through Cache memory units;
   (c) spy logic means connected to monitor commands transmitted on said first or second system bus means, said spy logic means including:
      (c1) a first processor, spy logic circuit, a second processor spy logic circuit, a third and fourth spy logic circuit respectively in said first, second, third and fourth processor modules;
      (c2) a first interface and second interface spy logic circuit in said first and second interface module means;
      (c3) wherein each said processor spy logic circuit and each said interface spy logic circuit includes;
         (c3a) means to sense write commands, to said main memory module means, from a requesting module;
         (c3b) means to invalidate particular data residing in said cache memory units of said first, second, third and fourth processor modules when such particular data no longer duplicates the newly written data in said main memory modules.
   (d) said common bus protocol including:
      (d1) an arbitration phase to select which module will get bus access as a requestor module;
      (d2) a transmit phase, handling both single word transfers in one clock cycle and four word transfers in a four clock cycle for transmitting destination addresses, commands and data to a receiving module;
      (d3) a receive phase, handling return of data from said receiving module to said requester module, of a single word in one clock cycle and four words in a four clock cycle;
   (e) maintenance processor means for partitioning said network to dedicate said first system bus means to processor modules having Store-Through Cache memory units and to dedicate said second system bus means to processor modules having Non-Store-Through Cache memory units.

2. The network of claim 1 wherein certain of said digital modules become sending requestor modules while other of said modules become receiving modules and wherein each of said processor and interface spy logic circuits includes:
   (a) means to monitor said first and second system busses to sense when two of said sending requestor modules are concurrently seeking the same data block in said main memory module;
   (b) means to inhibit one of said sending requestor modules from accessing said same data block in said main memory module.

3. The network of claim 2 wherein a sending requestor module and a concurrent competing sending requestor module simultaneously seek access to said system bus means and wherein each of said processor and interface spy logic circuits includes:
   (a) means to enable access to said first system bus means by said sending requestor module;
   (b) means to generate a retry signal, on said second system bus means, to said competing concurrent requestor module.

4. A dual system bus network having a common bus protocol supporting processor modules using a Store-Through Cache Memory and processor modules using a Non-Store Through Cache memory, said network comprising:

(a) first and second system bus means which are duplicates of each other and operate on said common bus protocol, each of said bus means including:

(a1) connection means to each one of a plurality of digital modules;

(b) said plurality of digital modules including:

(b1) first and second processor modules having respective first and second Store-Through (ST) cache memory units and first and second spy logic means for monitoring data on said system bus means;

(b2) main memory module means for storing addressable data available upon request from said processor error modules and form first and second interface modules;

(c) said first and second interface modules for interfacing peripheral units and each including:

(c1) means to request data from said processor modules and said cache memory units;

(c2) means to receive data from said processor modules;

(c3) means to transmit data to said processor modules and said cache memory units;

(c4) spy logic means to sense any write operations occurring on said system bus means;

(c5) cache memory means for storing addresses, commands and data words;

(d) third and fourth processor modules having respective third and fourth Non-Store Through (NST) cache memory units and third and fourth spy logic means for monitoring data on said system bus means;

(e) maintenance processor means connected to each of said processor modules, main memory means and said interbus interface means, including (e1) means to partition said network so that said first system bus means services said first and second processor modules having Store Through Cache memory units and said second system bus means services said third and fourth processor modules having said Non-Store-Through Cache memory units.

5. The network of claim 4 wherein said maintenance processor means includes:

(a) means to dedicate both of said first and second system bus means for exclusive use of said first and second processor modules having said first and second Store-Through cache memory units.

6. The network of claim 4 wherein said maintenance processor means includes:

(a) means to dedicate both of said first and second system bus means for exclusive use of said third and fourth processor modules having respective third and fourth Non-Store-Through cache memory units.

7. The network of claim 4 which includes:

(a) arbitration circuit means for establishing access priority value for each module in said network and including:

(a1) means for granting bus access to said first system bus means to a requesting module having a higher priority than a concurrently requesting module of a lower priority value;

(a2) means for granting bus access to said second system bus means to a requesting module having a lower priority than a concurrently requesting module of a higher priority value.

* * * * *